(12) United States Patent
Tsuruta et al.

(10) Patent No.: US 8,220,594 B2
(45) Date of Patent: Jul. 17, 2012

(54) ELECTRIC BRAKE DEVICE

(75) Inventors: Tomohiko Tsuruta, Nukata-gun (JP); Motonori Tominaga, Anjo (JP); Haruo Arakawa, Toyota (JP); Takayuki Takeshita, Anjo (JP); Jin Yamada, Toyota (JP); Takahisa Yokoyama, Anjo (JP)

(73) Assignees: Nippon Soken, Inc, Nishio-shi (JP); Advics Co., Ltd., Kariya (JP)

( * ) Notice: Subject to any disclaimer, the term of this patent is extended or adjusted under 35 U.S.C. 154(b) by 999 days.

(21) Appl. No.: 12/196,648

(22) Filed: Aug. 22, 2008

(65) Prior Publication Data

US 2009/0057074 A1 Mar. 5, 2009

(30) Foreign Application Priority Data

Aug. 30, 2007 (JP) ................................. 2007-224902
Jul. 9, 2008 (JP) ................................. 2008-179620

(51) Int. Cl.
*F16D 55/08* (2006.01)
(52) U.S. Cl. ..................... 188/72.7; 188/71.9; 188/72.1; 188/157; 188/158; 188/162
(58) Field of Classification Search ................ 188/71.7, 188/71.8, 71.9, 72.1, 72.3, 72.7, 157, 158, 188/162
See application file for complete search history.

(56) References Cited

U.S. PATENT DOCUMENTS

| | | | | |
|---|---|---|---|---|
| 3,900,084 | A * | 8/1975 | Farr | 188/196 F |
| 6,279,691 | B1 * | 8/2001 | Takahashi et al. | 188/72.8 |
| 6,626,270 | B2 * | 9/2003 | Drennen et al. | 188/72.1 |
| 6,854,572 | B2 * | 2/2005 | Usui | 188/72.8 |
| 6,938,736 | B2 * | 9/2005 | Takahashi | 188/72.1 |
| 6,959,791 | B2 * | 11/2005 | Usui | 188/72.1 |
| 6,971,484 | B2 * | 12/2005 | Sekiguchi | 188/72.7 |
| 7,828,124 | B2 * | 11/2010 | Sano et al. | 188/156 |
| 7,950,503 | B2 * | 5/2011 | Shigeta et al. | 188/72.1 |
| 8,056,683 | B2 * | 11/2011 | Usui | 188/31 |
| 2003/0042084 | A1 * | 3/2003 | Kawase et al. | 188/72.1 |
| 2005/0217949 | A1 * | 10/2005 | Ohta | 188/72.8 |
| 2009/0032342 | A1 * | 2/2009 | Yamaguchi | 188/72.3 |

FOREIGN PATENT DOCUMENTS

| JP | 2002-213505 A | 7/2002 |
|---|---|---|
| JP | 2005-233224 A | 9/2005 |

* cited by examiner

*Primary Examiner* — Robert A Siconolfi
*Assistant Examiner* — Mariano Sy
(74) *Attorney, Agent, or Firm* — Sughrue Mion, PLLC

(57) ABSTRACT

An electric brake device comprises a caliper holding braking members and having an electric motor attached thereto, a reduction mechanism for transmitting an input rotation of one input element thereof from the electric motor to two output elements thereof at reduced speeds, a rotation-linear motion converting mechanism for converting the rotation of one of the output elements into a linear motion of one of the braking members, and a thrust force support member connected to the other output element and screw-engaged with the caliper, wherein the rotation-linear motion converting mechanism is supported by the thrust force support member to be movable together in a thrust direction and is provided with rotation limiting portions for limiting the rotation in a reverse direction of the one output element to a predetermined range, and wherein the thrust force support member is set to be greater in resistance to operation than the rotation-linear motion converting mechanism.

14 Claims, 8 Drawing Sheets

US 8,220,594 B2

ELECTRIC BRAKE DEVICE

INCORPORATION BY REFERENCE

This application is based on and claims priority under 35 U.S.C. 119 with respect to Japanese Applications No. 2007-224902 filed on Aug. 30, 2007 and No. 2008-179620 filed on Jul. 9, 2008, the entire contents of which are incorporated herein by reference.

BACKGROUND OF THE INVENTION

1. Field of the Invention

The present invention relates to an electric brake device of the type that rotational motion from an electric motor is reduced by a reduction gear and is converted by a rotation-linear motion converting mechanism into a linear motion to press braking members against a brake rotor.

2. Discussion of the Related Art

As vehicle brake devices, as described in Japanese unexamined, published patent application No. 2002-213505, there has been known an electric brake device wherein a rotational motion from an electric motor is converted by a ball-screw mechanism into a linear motion to press braking members against a brake rotor.

In the vehicle brake devices of this kind, the electric motor is rotated in a positive-going direction at the time of a braking operation to move a screw shaft of the ball-screw mechanism toward the brake rotor side, but is rotated in a reverse direction at the time of a braking release operation to move the screw shaft toward the side away from the brake rotor. In the brake device described in the Japanese application, a problem arises in that the responsibility in the braking operation is deteriorated when friction members on the braking members are worn away, because a moving distance through which each friction member is moved until the same is pressed against the brake rotor is made to be longer.

As one for solving the aforementioned problem, there has been known an electric brake device which is provided with a wear compensating mechanism for the wears of friction members, as described in Japanese unexamined, published patent application No. 2005-233224. In the device, a through hole is provided in a screw shaft of a ball-screw mechanism, a strut shaft with a male screw large in lead angle is made to pass through the through hole with the male screw being in screw engagement with a screw hole formed on a part of the through hole, and a spring is provided for urging the strut shaft to be pressed against a stopper provided on a base end side.

In the brake device described in the last mentioned Japanese patent, when the electric motor is rotated at the time of a braking operation, the screw shaft of the ball-screw mechanism is moved forward to press a braking member against a brake rotor, and the strut shaft is moved together with the screw shaft. However, when separated from the stopper, the strut shaft being urged by the spring toward the base end side is loosened at the screw of the large lead angle and is moved relative to the screw shaft toward the base end side as it is rotated. Then, the strut shaft is again brought into abutting contact with the stopper and struts and supports the screw shaft not to allow the same to retract rearward. As a consequence, as the wear of the braking member proceeds, the pressing position of the same is gradually changed to be shifted forward, and with the change of the pressing position, the position of the screw shaft strutted and supported by the strut shaft is also changed forward. This advantageously makes it possible to hold the pressing portion of the screw shaft always close to the pressing position of the braking member, so that the responsibility in braking performance can be secured to be high.

However, in the brake device described in the last mentioned Japanese patent, the wear compensating mechanism is configured to be built in the pressing portion which is pressed against the brake rotor, and this unavoidably increases the mass of the pressing portion axially movable by the electric motor, so that the braking responsibility becomes liable to suffer an adverse effect. In addition, the wear compensating mechanism is arranged at a position close to a friction member (pad) on the braking member, and this gives rise to a problem that the brake device is susceptible to the influences of vibration and heat from the friction member.

SUMMARY OF THE INVENTION

Accordingly, it is a primary object of the present invention to provide an improved electric brake device which excels in the responsibility of braking performance and which does not deteriorate in the responsibility despite the wear of braking members.

Briefly, according to the present invention, there is provided an improved electric brake device, which comprises a braking member for being pressed against a brake rotor; a caliper holding the braking member; a pressing member connected to the braking member; an electric motor attached to the caliper; a reduction mechanism having one input element and two output elements for receiving an input rotation from the electric motor at the one input element and for transmitting the input rotation to the two output elements at reduced speeds; a rotation-linear motion converting mechanism connected to one of the output elements of the reduction mechanism for converting the rotation of the one output element into a linear motion of the pressing member; and a thrust force support member connected to the other output element of the reduction mechanism and screw-engaged with the caliper. The rotation-linear motion converting mechanism is supported by the thrust force support member to be bodily in a thrust direction and is provided with rotation limiting means for limiting the rotation in one direction of the one output element to a predetermined range, and the thrust force support member is set to be greater in operation resistance than the rotation-linear motion converting mechanism.

With this configuration, the electric brake device is provided with the reduction mechanism operable by the electric motor and having the one input element and the two output elements, the rotation-linear motion converting mechanism operable by the reduction mechanism, and the thrust force support member. Thus, the device is not only capable of compensating the retracted position of the braking member for wear of the same, but is also capable of preventing the deterioration in responsibility which would otherwise occur due to an increase in mass of the pressing member. That is, because a mechanism for compensating the retracted position of the braking member for wear of the same is not provided between the rotation-linear motion converting mechanism and the braking member, it can be avoided that the pressing member moved linearly at the time of a braking operation would otherwise be increased in mass by the provision of such a compensating mechanism. Further, because such a wear compensating mechanism can be arranged at a position away from a friction member of the braking member, the electric brake device becomes unsusceptible to the influences of vibration and heat, and therefore, it can be realized to make the electric brake device hard to fail.

BRIEF DESCRIPTION OF THE ACCOMPANYING DRAWINGS

The foregoing and other objects and many of the attendant advantages of the present invention may readily be appreciated as the same becomes better understood by reference to the preferred embodiments of the present invention when considered in connection with the accompanying drawings, wherein like reference numerals designate the same or corresponding parts throughout several views, and in which.

Figure 7A:
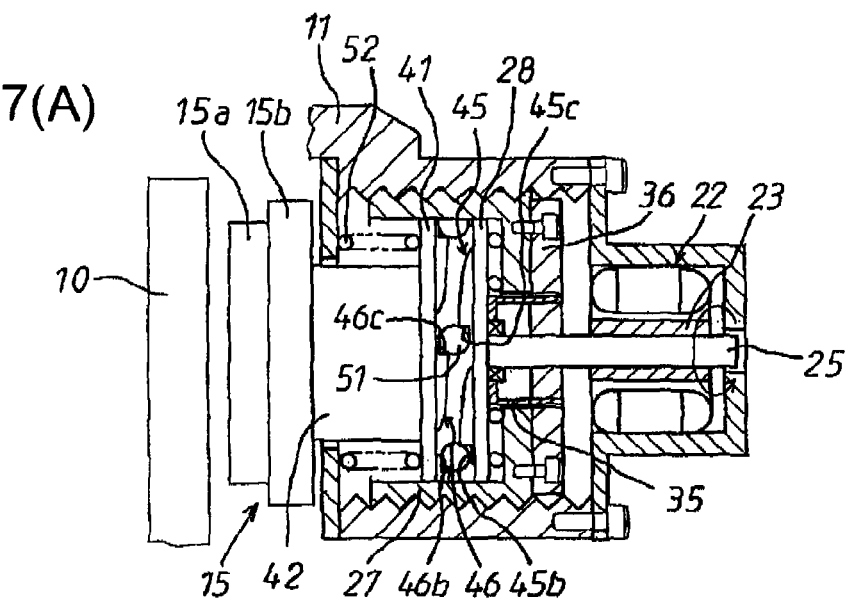
Figure 7B:
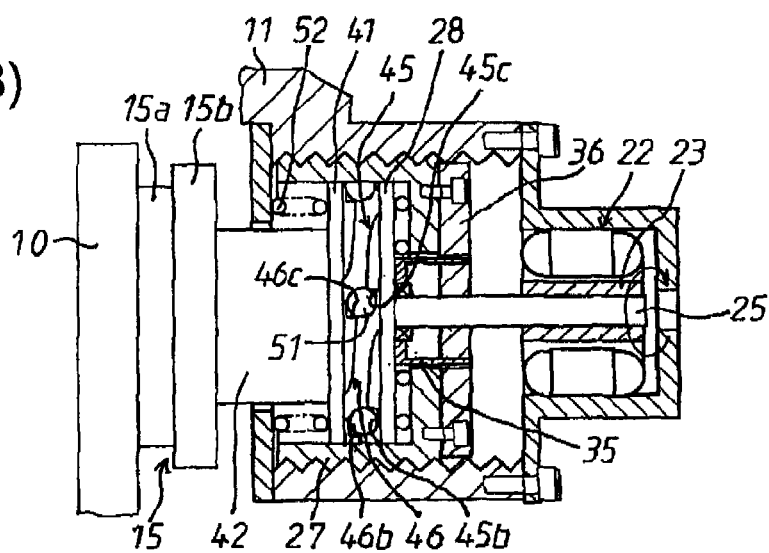
Figure 7C:
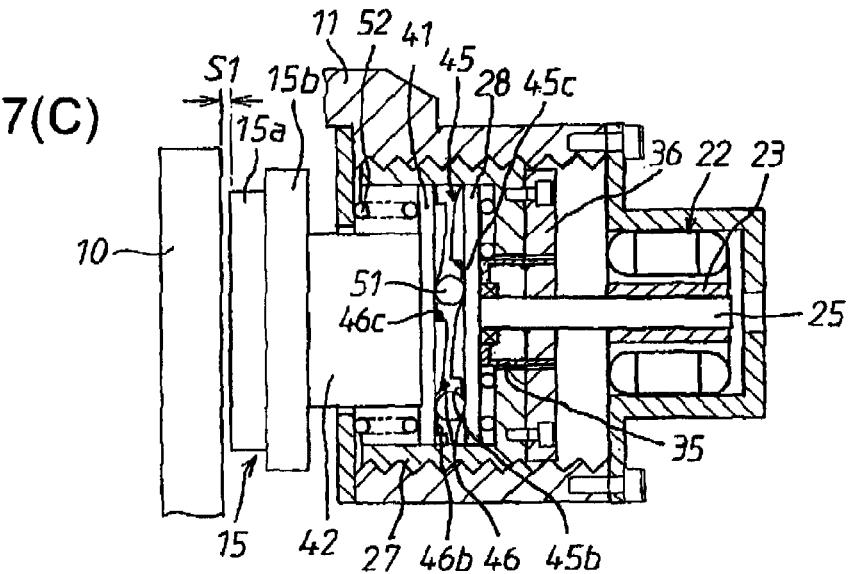
Figure 8:
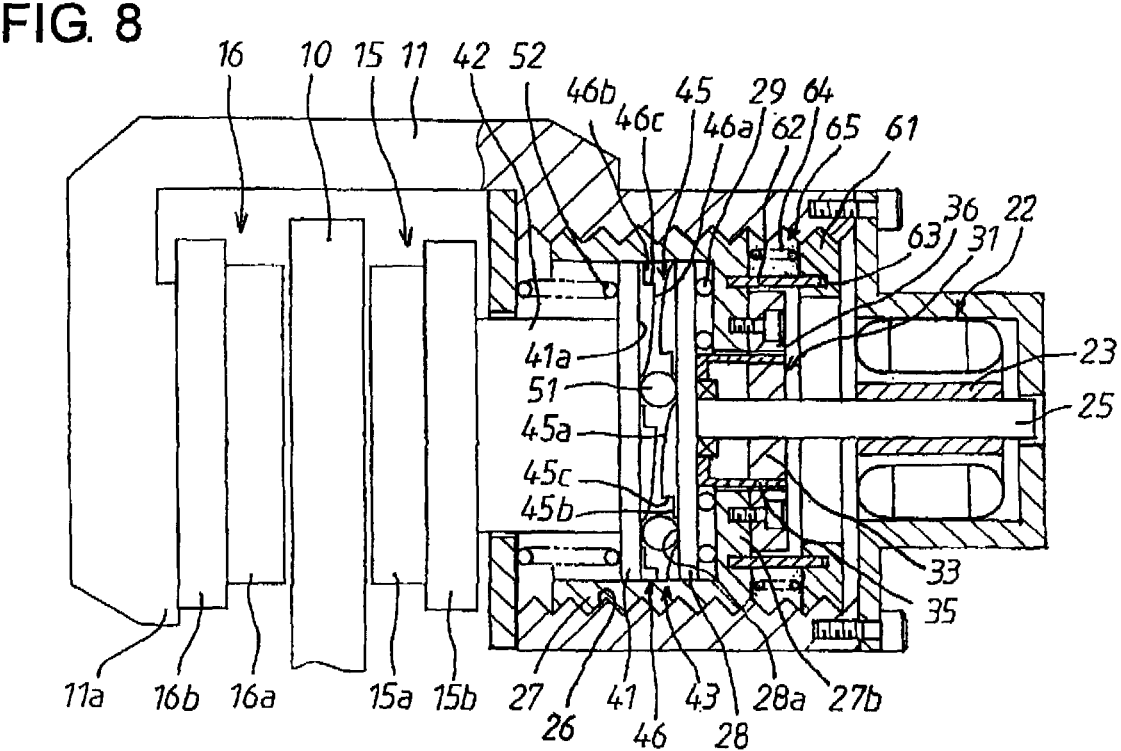
Figure 9:
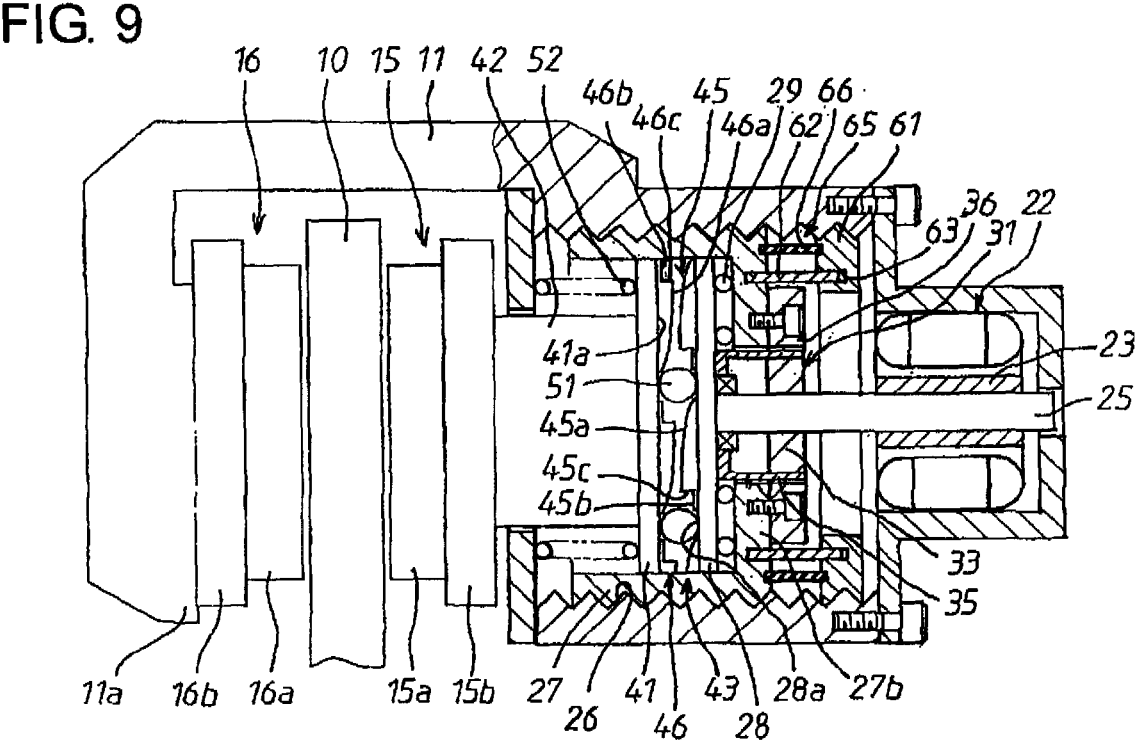
Figure 10:
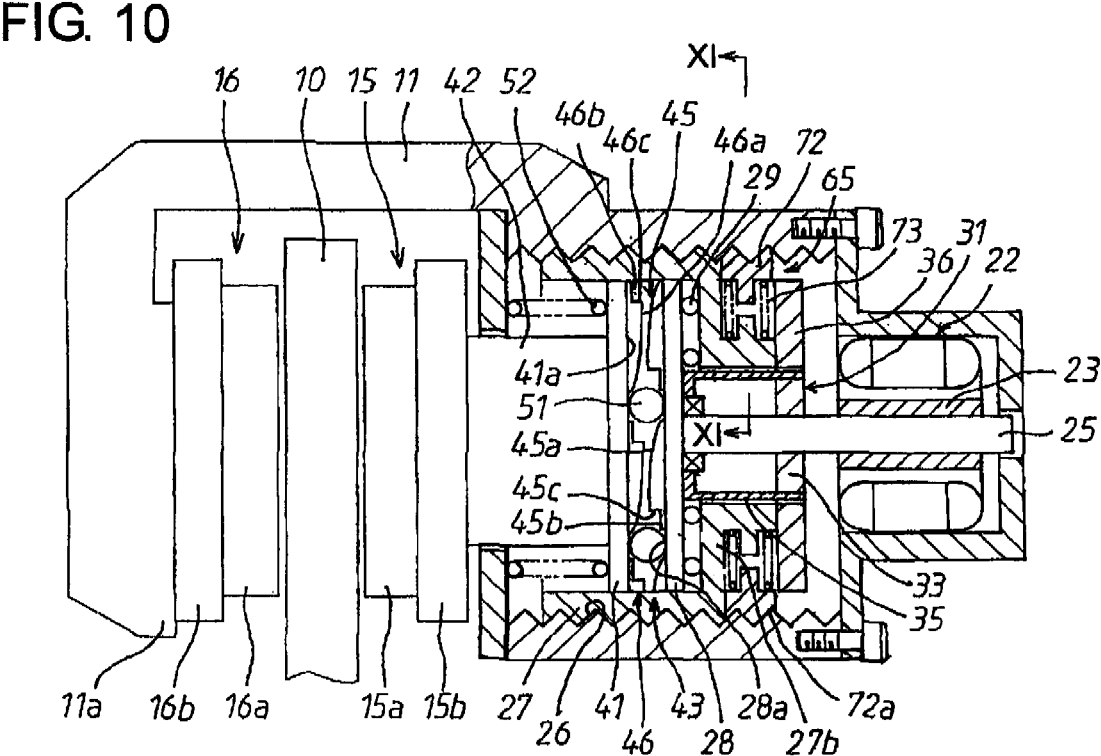
Figure 11:
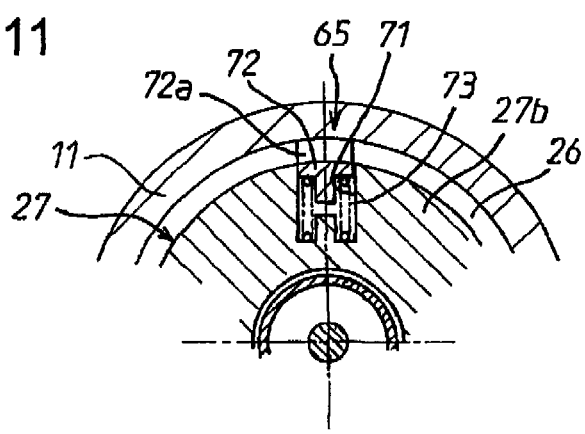
Figure 12:
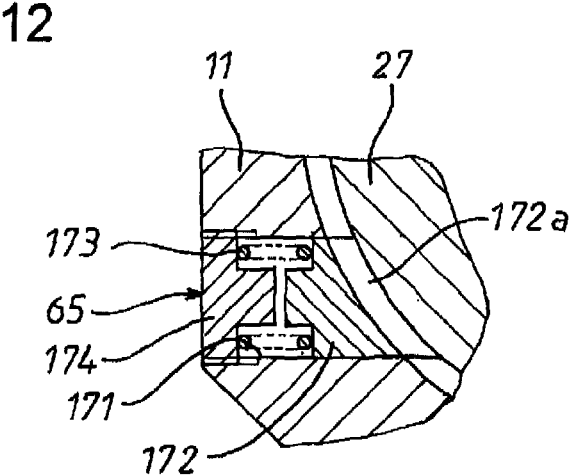
Figure 13:
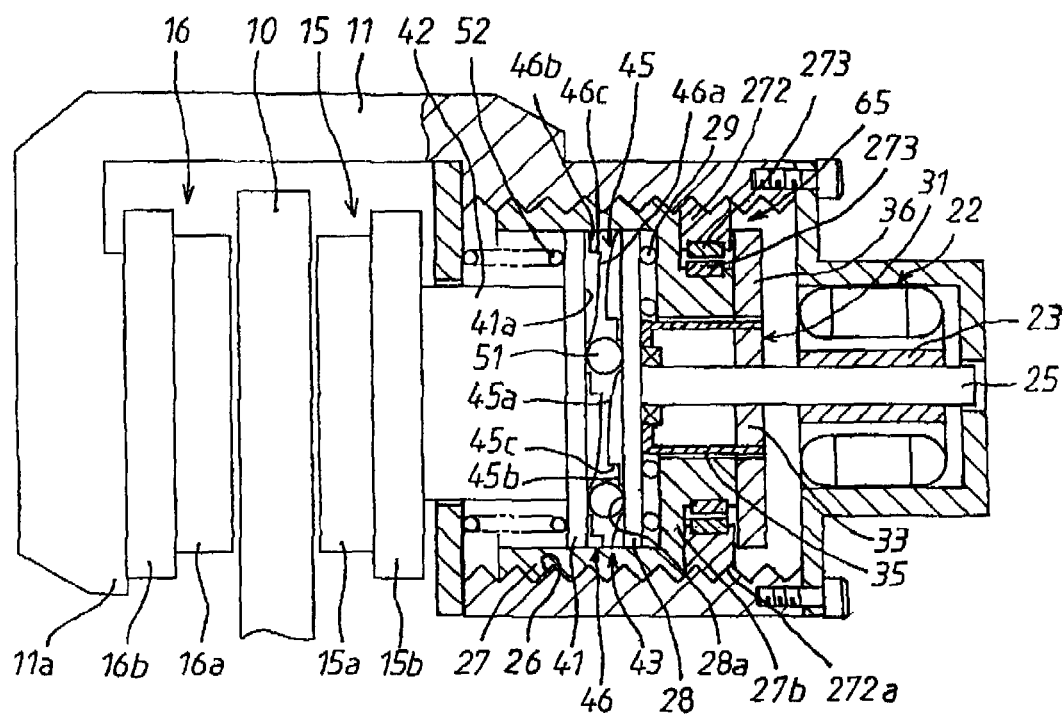

FIGS. 7(A)-7(C) are fragmentary sectional views showing respective operational states of the electric brake device during a wear compensation operation;

FIG. 8 is a schematic view partly in section of an electric brake device in a second embodiment according to the present invention;

FIG. 9 is a schematic view partly in section of an electric brake device in a modification of the second embodiment;

FIG. 10 is a schematic view partly in section of an electric brake device in a third embodiment according to the present invention;

FIG. 11 is a fragmentary cross-sectional view taken along line XI-XI in FIG. 10;

FIG. 12 is a fragmentary cross-sectional view of an electric brake device in a fourth embodiment according to the present invention; and FIG. 13 is a schematic view partly in section of an electric brake device in a fifth embodiment according to the present invention.

DETAILED DESCRIPTION OF THE PREFERRED EMBODIMENTS

First Embodiment

Figure 1:
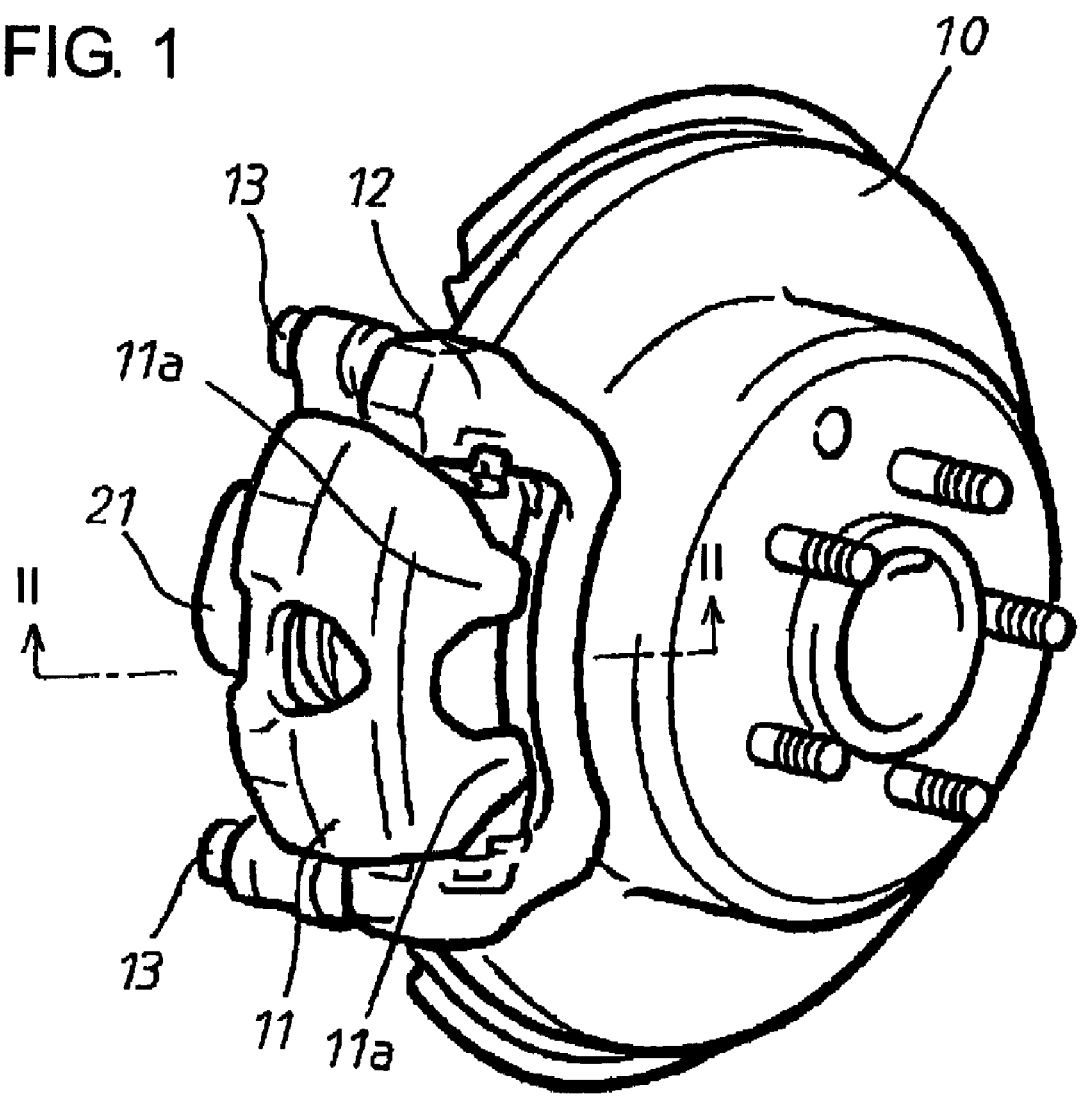
FIG. 1 is an exterior view of an electric brake device in a first embodiment according to the present invention.
Figure 2:
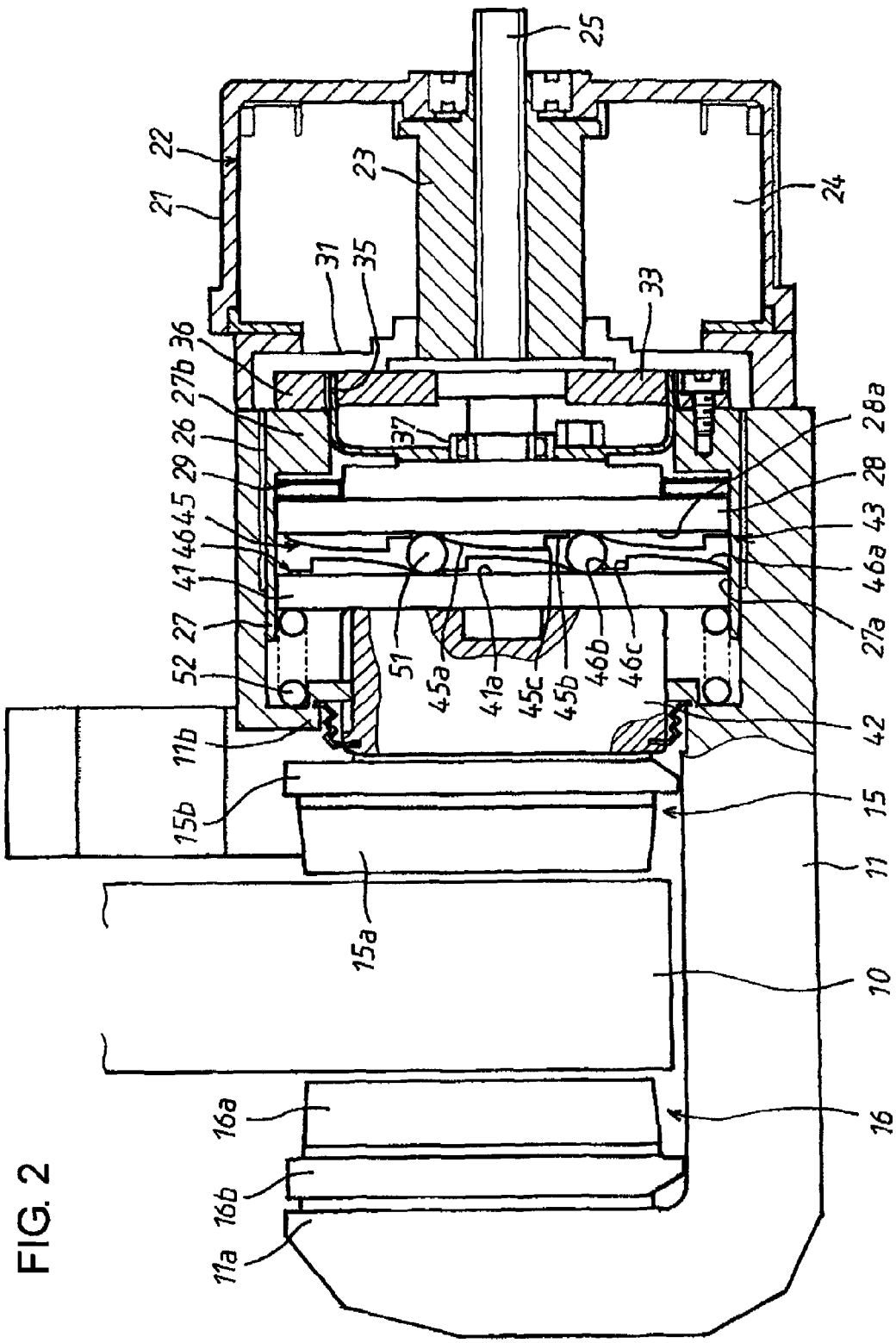
FIG. 2 is an enlarged cross-section taken along the line II-II in FIG. 1 of the electric brake device.

Hereafter, an electric brake device in a first embodiment according to the present invention will be described with reference to FIGS. 1 to 7. Referring now to FIGS. 1 and 2, numeral 10 denotes a brake rotor of the electric brake device, and the brake rotor 10 is bodily attached to a wheel of an automotive vehicle (both not shown) incorporating the electric brake device. At a part of the circumferential surface of the brake rotor 10, a caliper 11 taking a U-shape in cross-section is arranged to be astride the brake rotor 10. The caliper 11 is supported by a mount member 12 secured on a vehicle body side, through a pair of slide pins 13 and is movable by a short distance in the axial direction of the brake rotor 10.

A pair of first and second brake pads 15, 16 as braking members are arranged to face opposite sides of the brake rotor 10 in the axial direction. The first brake pad 15 arranged inside of the brake rotor 10, that is, on the vehicle body side is attached to a pressing member 42 which is movable in the axial direction of the brake rotor 10, as referred to later, while the second brake pad 16 arranged outside of the brake rotor 10, that is, on the side opposite to the vehicle body is attached to claw portions 11a of the caliper 11. The pressing member 42 is prevented by a rotation stop portion 11b, which is formed on the caliper 11 to define a key fitted in a keyway formed on the pressing member 42, from rotating relative to the caliper 11. The first brake pad 15 is movable in the axial direction only of the brake rotor 10. The first and second brake pads 15, 16 are composed of friction members 15a, 16a, which are slidable on and frictionally engageable with the brake rotor 10, and back plates 15b, 16b holding the friction members 15a, 16a, respectively. In a modified form, the mount member 12 may be provided with a rotation stop member which replaces the rotation stop portion 11b, for holding the first brake pad 15 to be no-rotatable relative to the caliper 11.

The first and second brake pads 15, 16 perform a braking action on the brake rotor 10 by being pressed against the opposite surfaces of the brake rotor 10 rotating bodily with the wheel, wherein brake force generating means is constituted by the aforementioned brake rotor 10, the caliper 11 and the first and second brake pads 15, 16.

The caliper 11 has a motor housing 21 secured to one end thereof, and an electric motor 22 of a built-in type is provided in the motor housing 21. The electric motor 22 is composed of a hollow rotor 23 and stator coils 24. The rotor 23 is rotatably supported by the motor housing 21, while the stator coils 24 are fixed to the internal surface of the motor housing 21. The rotor 23 is rotated when electric current is applied to the stator coils 24. The rotor 23 allows an input shaft 25 to pass therethrough coaxially, and the input shaft 25 is in spline-engagement with the rotor 23 to be movable relative to the same in the axial direction only.

Further, the caliper 11 has a threaded hole or screw hole 26 formed co-axially with the input shaft 25, and a screw member 27 is screw-engaged with the screw hole 26. The screw member 27 has a cylindrical hole 27a formed coaxially with the input shaft 25, and a disc-like rotational member 28 is rotatably received in the cylindrical hole 27a. A thrust bearing 29 is interposed between the rotational member 28 and a flange portion 27b formed at one end of the screw member 27.

A reduction mechanism 31 with one input element and two output elements is arranged between the input shaft 25, the screw member 27 and the rotational member 28. The reduction mechanism 31 is constituted by, for example, a strain wave gearing known as "Harmonic Drive" (a registered trademark of Harmonic Drive Systems Inc., Tokyo, Japan). The strain wave gearing (reduction mechanism) 31 is composed of a wave generator 33, a flexible spline (known as "flexspline") 35 and a circular spline 36, wherein one end of the flexible spline 35 is bodily connected to the rotational member 28, while the circular spline 36 is bodily connected to the flange portion 27b of the screw member 27. An external gear is formed on the external surface at the other end of the flexible spline 35, and an internal gear which partly meshes with the external gear of the flexible spline 35 is formed at the internal surface of the circular spline 36. The number of gear teeth of the internal gear is set to be greater by, for example, two than that of gear teeth of the external gear. The flexible spline 35 receives and supports the input shaft 25 through a bearing 37 in an internal surface at one end thereof, so that the input shaft 25 is rotatable relative thereto (i.e., relative to the rotational member 28) but is movable together in the axial direction.

Although not illustrated in detail, the wave generator 33 is provided with a rotatable elliptical cam (not shown), to which the input shaft 25 is bodily connected to be rotated together. An inner race of a ball bearing (not shown) is secured to the circumferential surface of the elliptical cam, and an elastically deformable outer race of the ball bearing is supported around the inner race through a plurality of balls. The flexible spline 35 is secured to the elastically deformable outer race.

In the strain wave gearing (i.e., reduction mechanism) 31 as constructed above, upon rotation of the input shaft 25, the elliptical cam of the wave generator 33 is rotated together therewith, and the rotation of the elliptical cam causes the flexible spline 35 to be deformed to an elliptical shape, whereby the meshing point of the flexible spline 35 with the circular spline 36 is moved in the circumferential direction. As a consequence, the circular spline 36 (flexible spline 35) is rotated relative to the flexible spline 35 (circular spline 36). In this way, the strain wave gearing 31 operates to receive a rotational input which is inputted from the electric motor 22 through the input shaft 25 to one input element thereof comprising the elliptical cam, and to transmit the rotational input to two output elements thereof comprising the flexible spline 35 and the circular spline 36 (i.e., to the rotational member 28 and the screw member 27) at reduced speeds.

In the cylindrical hole 27a of the screw member 27, a disc-like axially movable member 41 is received in face-to-face relation with the aforementioned disc-like rotational member 28, and the axially movable member 41 is bodily connected to the pressuring member 42. With the axial movement of the axially movable member 41, the friction member 15a of the first brake pad 15 is moved toward and away from the brake rotor 10 through the pressuring member 42.

Between the rotational member 28 and the axially movable member 41, there is provided a rotation-linear motion converting mechanism 43 which converts the rotational motion of the rotational member 28 into the linear motion of the axially movable member 41 and the pressuring member 42. The motion converting mechanism 43 is composed of first and second cam portions 45, 46 which are respectively provided at mutually facing surfaces 28a, 41a of the rotational member 28 and the axially movable member 41 and a plurality of rolling rollers 51 as rolling elements arranged between the cam portions 45 and 46.

The construction of the rotation-linear motion converting mechanism 43 will be further described in detail with reference to FIGS. 2 to 4. On the facing surface 28a of the rotational member 28 facing the axially movable member 41, a plurality (four in this particular embodiment) of the first cam portions 45 are arranged at equiangular intervals on a circle having its center on the rotational axis of the rotational member 28. The plurality of first cam portions 45 are of the same shape as one another, and each of the first cam portions 45 is provided at one or starting end in a reverse rotation direction (i.e., in the clockwise direction as viewed in FIG. 4) with a first gradient portion 45a, on which a gentle arc slope is formed to gradually approach the facing surface 41a of the axially movable member 41 as the slop goes when the rotational member 28 is rotated in a positive-going direction (i.e., in the counterclockwise direction as viewed in FIG. 4). At the other or terminal end (i.e., the starting end in the positive-going direction) of each first cam portion 45, a first stepped portion 45b is formed which is set to be higher by a slight dimension S1 (refer to FIG. 3) as step height than the facing surface 28a of the rotational member 28. A first stopper portion 45c which is normal to the facing surface 28a is formed at a boundary portion between each first gradient portion 45a and an associated first stepped portion 45b.

On the other hand, on the facing surface 41a of the axially movable member 41 facing the rotational member 28, the second cam portions 46 of the same number as the first cam portions 45 are arranged at equiangular intervals on the circle having its center on the rotational axis of the rotational member 28. The plurality of second cam portions 46 take the same shape as the first cam portions 45, but are arranged to be sloped in a direction opposite to the direction in which the plurality of first cam portions 45 are sloped. Specifically, each of the second cam portions 46 is provided at one or starting end in the positive-going rotational direction of the rotational member 28 with a second gradient portion 46a, on which a gentle arc slope is formed to gradually approach the facing surface 28a of the rotational member 28 as the slope goes in the counterclockwise direction as viewed in FIG. 4. At the other or terminal end of each second cam portion 46, a second stepped portion 46b is formed, which is set to be higher by the slight dimension S1 (refer to FIG. 3) as step height than the facing surface 41a of the axially movable member 41. A second stopper portions 46c which is normal to the facing surface 41a is formed at a boundary portion between each second gradient portion 46a and an associated second stepped portion 46b.

Figure 3:
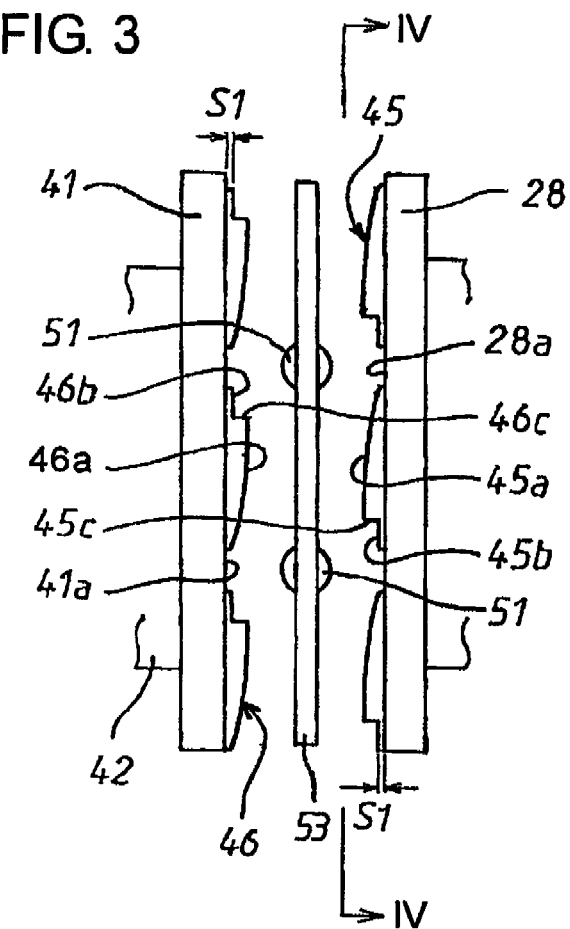
FIG. 3 is a fragmentary view in a disassembled state of a rotation-linear motion converting mechanism shown in FIG. 2.

A retainer 53 shown in FIG. 3 is arranged coaxially with the rotational member 28 and immovably in radial directions between the respective facing surfaces 28a and 41a of the rotational member 28 and the axially movable member 41. The retainer 53 rotatably holds the rolling rollers 51 of the same number as either of the first and second cam portions 45, 46 at equiangular intervals. Each rolling roller 51 rolls between each first cam portion 45 and a second cam portion 46 facing the same and serves to axially move the axially movable member 41 with the rotational motion of the rotational member 28.

In an ordinary state, each rolling roller 51 is located between circumferentially adjoining first cam portions 45 and between circumferentially adjoining second com portions 46 and is kept in contact with the facing surfaces 28a, 41a of the rotational member 28 and the axially movable member 41. This situation constitutes an initial or retracted position (i.e., reference position) of the rotation-linear motion converting mechanism 43. When the rotational member 28 is rotated from this state in the positive-going direction as arrowed in FIG. 4, the rolling rollers 51 run up onto the respective gradient portions 45a, 46a of the first and second cam portions 45, 46, and causes the axially movable member 41 to move forward linearly as they go on the respective gradient portions 45a, 46a. Conversely, when the rotational member 28 is rotated by a predetermined angle in the reverse rotation direction (in the direction opposite to the arrowed direction in FIG. 4) from the state that the rotation-linear motion converting mechanism 43 is at the reference position, the rolling rollers 51 run up onto the respective stepped portions 45b, 46b of the first and second cam portions 45, 46, whereby the axially movable member 41 is linearly moved forward by the double (S1×2) of the aforementioned step height S1.

When the rotational member 28 is driven to be rotated beyond a predetermined angle in the reverse direction, the rolling roller 51 are brought into engagements with the respective stopper portions 45c, 46c of the first and second cam portions 45, 46, whereby further reverse rotation of the rotational member 28 can be prevented.

Referring again to FIG. 2, a compression spring 52 is interposed between the axially movable member 41 and the caliper 11, and the axially movable member 41 is urged by the resilient force of the spring 52 toward the rotational member 28 in the thrust direction. This causes the axially movable member 41 and the rotational member 28 to be brought into contact state through the rolling rollers 51 and also causes the rotational member 28 to rest on the flange portion 27b of the screw member 27 through the thrust bearing 29, so that the rotation-linear motion converting mechanism 43 can be supported in the screw member 27 as if they were one body in the axial or thrust direction. Thus, the aforementioned screw member 27 serves as a thrust force support member.

Figure 4:
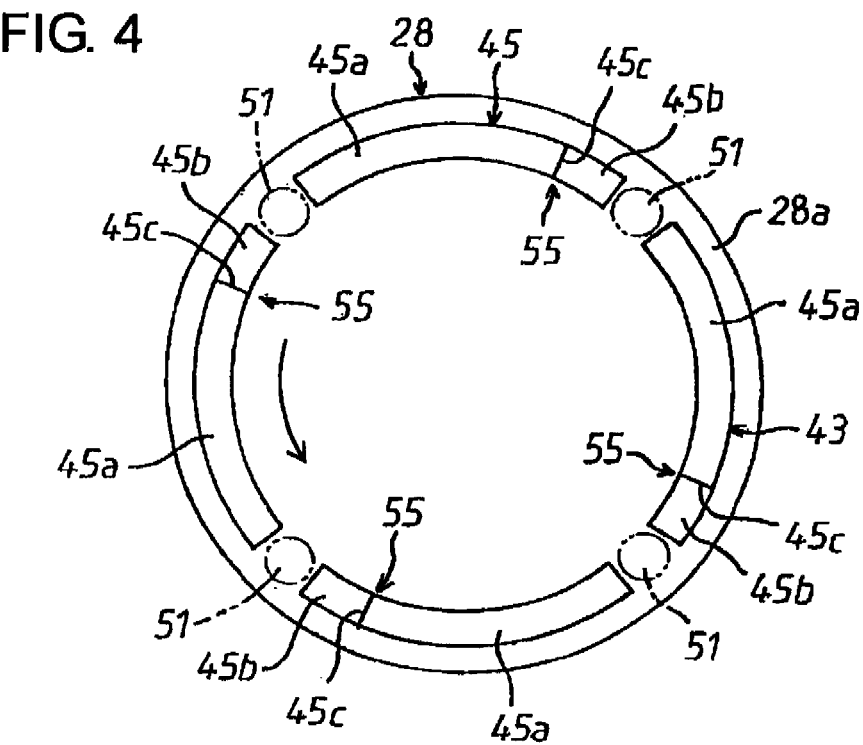
FIG. 4 is a view taken along the line IV-IV in FIG. 3.

With the aforementioned construction, when the rotational member 28 is rotated in, e.g., the arrowed direction in FIG. 4, the rolling rollers 51 roll to run up onto the first gradient portions 45a of the rotational member 28 and also to run up onto the second gradient portions 46a of the axially movable member 41. Thus, the axially movable member 41 being non-rotatable is moved in a direction heading for the brake rotor 10 against the resilient force of the compression spring 52 to press the first brake pad 15 against the brake rotor 10.

Conversely, when the rotational member 28 is rotated in the direction opposite to the arrowed direction in FIG. 4, the rolling rollers 51 roll to run up onto the first stepped portions 45b of the rotational member 28 and to run up onto the second stepped portions 46b of the axially movable member 41. Thus, the axially movable member 41 is separated by the predetermined distance (S1×2) from the rotational member 28.

It is to be noted that the rotation-linear motion converting mechanism 43 is constituted by the first cam portions 45 provided on the rotational member 28, the second cam portions 46 provided on the axially movable member 41, the rolling rollers 51 provided between the first and second cam portions 45, 46, and the like and that the stopper portions 45c, 46c of the first and second cam portions 45, 46 constitute rotation limiting means 55 (FIG. 4) for limiting the rotation in one direction of the rotational member 28 connected to the flexible spline 35 to a predetermined range.

As described earlier, in the present first embodiment, the screw member 27 and the rotation-linear motion converting mechanism 43 are respectively connected to the two output elements (i.e., the circular spline 36 and the flexible spline 35) of the strain wave gearing (reduction mechanism) 31.

In this particular embodiment, the screw member 27 is great in inertia because of being large in diameter and thus, a strong resistance against operation acts on the screw member 27 due to friction acting at the screw surface thereof, whereas only a weak resistance against operation acts on the rotation-linear motion converting mechanism 43. Thus, upon rotation of the input shaft 25, the rotational member 28 is ordinarily rotated together with the flexible spline 35, but the circular spline 36 and the screw member 27 are not rotated to remain in the stop state. However, when the rolling rollers 51 are brought into engagements with the respective stopper portions 45c, 46c (rotation limiting means 55) of the first and second cam portions 45, 46, the rotation (reverse rotation) of the flexible spline 35 and the rotational member 28 are restricted, which causes the circular spline 36 and the screw member 27 to be rotated by the rotation of the input shaft 25.

The rotation of the electric motor 22 is controlled in accordance with signals from an ECU (electronic control unit, not shown). The ECU has inputted thereto a detection signal from a pedal manipulation sensor (not shown) which detects the stepping amount of a brake pedal (not shown). The ECU is responsive to the detection signal from the pedal manipulation sensor to calculate the pressing force of the brake pads 15, 15, that is, the rotational amount of the electric motor 22 required to generate a predetermined braking force.

(Operation)

Figure 5:
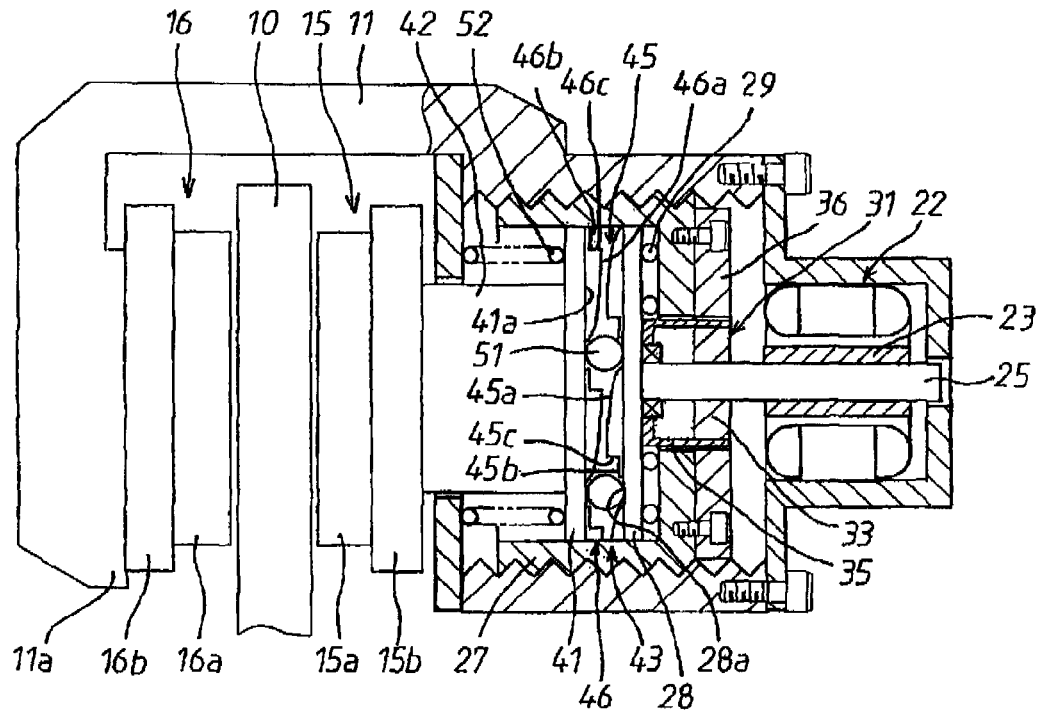
FIG. 5 is a schematic view partly in section of the electric brake device in an initial state.

Next, the operation of the electric brake device as constructed above in the first embodiment will be described with reference to FIGS. 5 and 6 which are schematic views for explaining the operation. At the time of non-braking (in the initial or ordinary state), as shown in FIG. 5, the axially movable member 41 is pressed by the resilient force of the compression spring 52 toward the rotational member 28 side. Each of the rolling rollers 51 remains positioned between the first cam members 45 of the rotational member 28 adjoining in the circumferential direction and between the second cam portions 46 of the axially movable member 41 adjoining in the circumferential direction and is pressed between the rotational member 28 and the axially movable member 41, wherein the axially movable member 41 is held in the state that it is closest to the rotational member 28.

In this state, when the electric motor 22 is driven in the positive-going direction in response to a step-in signal issued upon stepping of the brake pedal (not shown), the input shaft 25 is rotated together with the rotor 23 in the positive-going direction (the arrowed direction in FIG. 6) to rotate the wave generator 33. The rotation of the wave generator 33 urges the flexible spline 35 and the circular spline 36 to rotate.

Figure 6:
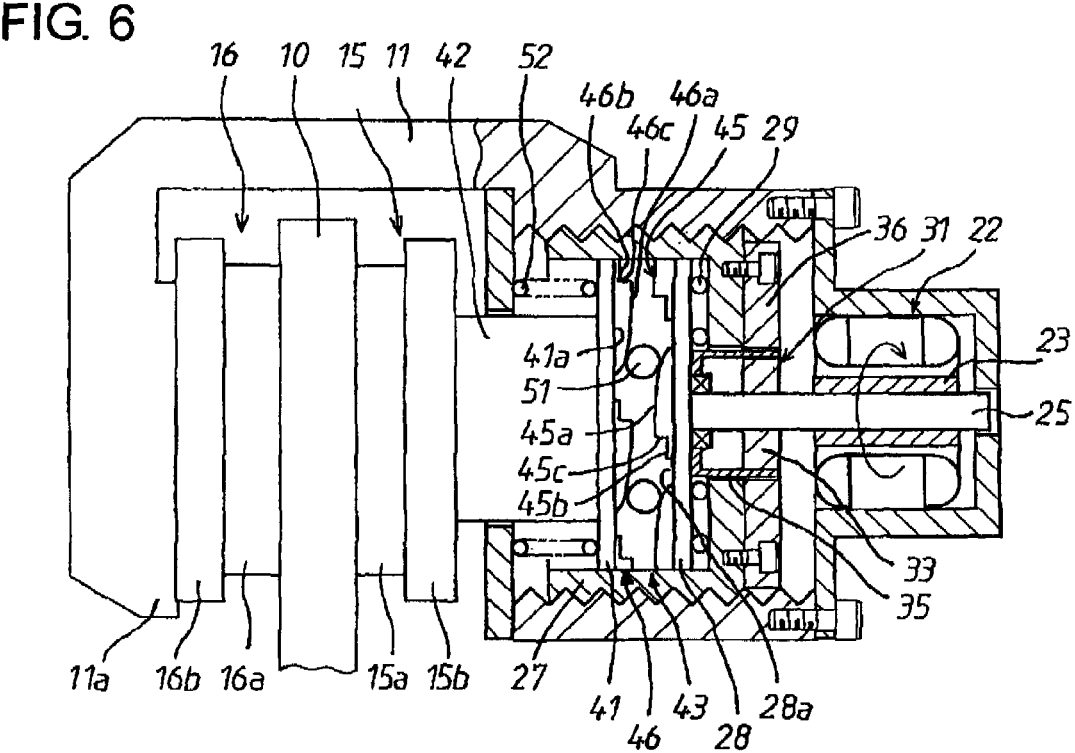
FIG. 6 is a schematic view partly in section of the electric brake device in an operated state.

At this time, since the screw member 27 connected to the circular spline 36 is large in inertia as being large in diameter and is given a great resistance against rotation due to the friction acting on the screw surface, the rotation of the input shaft 25 causes the rotational member 28 only to rotate together with the flexible spline 35 in the same direction as the rotation of the input shaft 25, that is, in the arrowed direction in FIG. 6, while the screw member 27 remains in a stationary state.

The rotation of the rotational member 28 causes the rolling rollers 51 to roll and run up onto the gradient portions 45a of the first cam portions 45 as well as onto the gradient portions 46a of the second cam portions 46 on the axially movable member 41 side. Thus, the axially movable member 41 is moved against the resilient force of the compression spring 52 in the direction away from the rotational member 28 and moves the first brake pad 15 through the pressing member 42 in the direction toward the brake rotor 10, whereby the first brake pad 15 is pressed against the brake rotor 10. As the first brake pad 15 is pressed against one side surface of the brake rotor 10, a reaction force is exerted on the caliper 11, which is thus moved along the slide pins 13 (refer to FIG. 1). As a consequence, as shown in FIG. 6, the second brake pad 16 secured to the caliper 11 is also pressed against the other side surface of the brake rotor 10, whereby a braking force can be generated.

For releasing the braking operation, the electric motor 22 is reversely driven in response to a signal indicating the release of the brake pedal. Thus, the input shaft 25 is rotated together with the rotor 23 in the reverse direction opposite to the arrowed direction in FIG. 6 to rotate the wave generator 33. The reverse rotation of the wave generator 33 causes the rotational member 28 to be rotated in the same direction as the rotational direction of the input shaft 25, whereby the first brake pad 15 is retracted together with the axially movable member 41 through the reverse operation to the foregoing operation. Then, when the rotation-linear motion converting mechanism 43 is returned to the initial position shown in FIG. 5, the rotation of the electric motor 22 is stopped.

The friction members 15a, 16a on the first and second brake pads 15, 16 are gradually worn out as the number of the braking operations increases. If the wears of the friction members 15a, 16a were left as they progress, gaps would increase between the opposite side surfaces of the brake rotor 10 and the first and second brake pads 15, 16 at the initial position, and this would result in deteriorating the responsibility in the braking operation.

To obviate this drawback, in the present first embodiment, it is designed to perform a wear compensation operation for the wears of the friction members 15a, 16a when necessary, e.g., once a day when an engine of the vehicle is first started. Hereafter, the wear compensation operation will be described with reference to FIG. 7.

When the execution of the wear compensation operation is instructed by the ECU (not shown) with the rotation-linear motion converting mechanism 43 held at the initial position as shown in FIG. 57 the electric motor 22 is reversely driven to reversely rotate the input shaft 25 together with the rotor 23 in the arrowed direction in FIG. 7(A). Since with the reverse rotation of the input shaft 25, the rotational member 28 is rotated in the same direction as the rotation of the input shaft 25, the rolling rollers 51 roll and run up onto the stepped portions 45b of the first cam portions 45 as well as onto the second stepped portions 46b on the axially movable member 41 as shown in FIG. 7(A). Thus, the axially movable member 41 is moved by the sum (S1×2) of the step heights S1 (refer to FIG. 3) of the stepped portions 45b, 46b toward the brake rotor 10 against the resilient force of the compression spring 52.

As the rotational member 28 is reversely rotated further by the electric motor 22, the rolling rollers 51 are brought into engagements with the first and second stopper portions 45c, 46c respectively, thereby preventing further rotation of the rotational member 28 in the reverse direction. As a consequence, with the reverse rotation of the input shaft 25 by the electric motor 22, the circular spline 36 connected to the screw member 27 is enabled to overcome the friction resistance which the screw hole 26 of the caliper 11 applies to the screw member 27, and is rotated in the direction opposite to the rotational direction of the input shaft 25, that is, in the positive-going direction. Thus, the screw member 27 is rotated in the screw hole 26 in the positive-going direction and is axially moved along the screw lead toward the brake rotor 10.

With the rotational and axial movements of the screw member 27, the rotational member 28, the axially movable member 41 and the like which are received in the cylindrical hole 27a of the screw member 27 are moved bodily with the screw member 27 in the thrust direction while being rotated relative to the screw member 27, in other words, while remaining in non-rotational state relative to the caliper 11. This brings the friction members 15a, 16a of the first and second brake pads 15, 16 into contacts with the brake rotor 10, as shown in FIG. 7(B).

Subsequently, when the input shaft 25 is rotated in the positive-going direction being the arrowed direction in FIG. 7(B) by rotating the electric motor 22 by a predetermined angle in the positive-going direction, the rotational member 28 is rotated the predetermined angle in the positive-going direction. This causes the rolling rollers 51 to go away from the respective stepped portions 45b, 46b of the first and second cam portions 45, 46b and then, to be brought into contacts again with the facing surfaces 28a, 41a (refer to FIG. 5) of the rotational member 28 and the axially movable member 41, as shown in FIG. 7(C). As a result, by the resilient force of the spring 52, the axially movable member 41 and the pressing member 42 are retracted by a predetermined distance in the direction away from the brake rotor 10, whereby a clearance corresponding to the sum (S1×2) of the step heights 51 of the stepped portions 45b, 46 is formed between the first and second brake pads 15, 16 and the brake rotor 10. In this way, the compensated position is set as a new initial or retracted position for the electric brake device.

As described above, since an appropriate slight clearance (gap) is formed by the execution of the wear compensation operation between the brake pads 15, 16 and the brake rotor 10, it is possible to maintain the responsibility in the braking performance high at all times despite the wears of the friction members 15a, 16a of the first and second brake pads 15, 16.

Figure 3A:
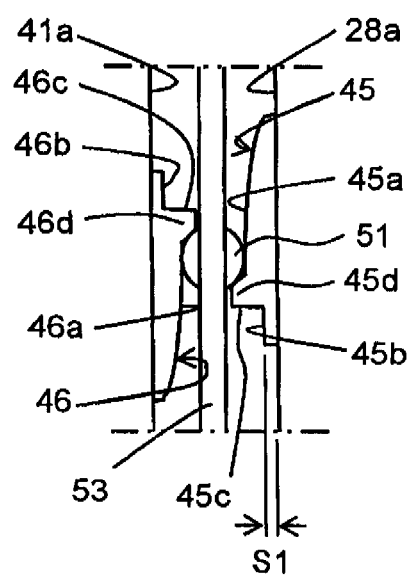
FIG. 3(A) is a fragmentary view slightly enlarged of a part of a rotation-linear motion converting mechanism in a modified form of the first embodiment.

When each of the friction members 15a, 16a are worn out beyond a predetermined amount to reach the end of the service lives thereof, they should be replaced by those fresh. For the purpose of replacement, the rotation-linear motion converting mechanism 43 may be modified as partly shown in FIG. 3(A), wherein top stoppers 45d, 46d for preventing the rotational member 28 from being further rotated beyond the top stoppers 45d, 46d are provided on the top end portions on the respective gradient portions 45a, 46a of the first and second cam portions 45, 46. Where the motion converting mechanism 43 is so modified, the replacements for the friction members 15a, 16a can be done by utilizing the rotation of the electric motor 22 as follows:

Specifically, the friction members 15a, 16a having reached the end of the service lives are detached from the first and second brake pads 15, 16 with the rotation-linear motion converting mechanism 43 held in the initial position, in which state the electric motor 22 is rotated in the positive-going direction to rotate the rotational member 28 together with the flexible spline 35 of the strain wave gearing (reduction mechanism) 31 in the positive-going direction, as mentioned earlier. Thus, the rolling rollers 51 run up onto the respective gradient portions 45a, 46a of the first and second cam portions 45, 46 and then come to abutting contacts with the top stoppers 45d, 46d provided at the top portions of the gradient portions 45a, 46a, as shown in FIG. 3(A). Upon abutting contacts of the rolling rollers 51 with the top stoppers 45d, 46d, the rotational member 28 is prevented from being further rotated in the positive-going direction, and this causes the screw member 27 to be rotated together with the circular spline 36 of the strain wave gearing (reduction mechanism) 31 in the reverse direction and thus, to be retracted in the screw hole 26.

When the electric motor 22 is then rotated in the reverse direction with the screw member 27 having been retracted to a predetermined retracted position, the rotational member 28 is reversely rotated to bring the rolling rollers 51 into contacts with the facing surfaces 28a, 41a of the rotational member 28 and the axially movable member 41. In this state, fresh friction members 15a, 16a are attached to the back plates 15b, 16b of the brake pads 15, 16. Thereafter, the aforementioned friction compensating operation is performed, whereby the gap between the fresh friction members 15a, 16a and the brake rotor 10 can be secured to a predetermined distance.

Second Embodiment

FIG. 8 shows a second embodiment according to the present invention. The difference from the first embodiment is that in the first embodiment, the friction resistance at the screw engagement between the screw hole 26 of the caliper 11 and the screw member (thrust force support member) 27 works to hold the screw member 27 in a stationary state, whereas in the second embodiment, there is separately provided an operation resistance application mechanism for positively applying operation resistance to the screw member 27, so that the screw member 27 can be reliably held in the stationary state. Therefore, hereinafter, description will be made mainly regarding the differences from the first embodiment, whereas description will be omitted regarding the components which are the same in construction and are given the same reference numerals as those in the first embodiment.

In FIG. 8, the screw member 27 is screwed into the screw hole 26 formed in the caliper 11. A screw compensation member 61 which compensates the operation resistance for a fixed or constant force is screwed into the screw hole 26 in a face-to-face relation with the flange portion 27b of the screw member 27. Connection members 62 as connection portions which are arranged at plural portions (preferably at equiangular intervals) in the circumferential direction are connected to either one of the screw compensation member 61 and the flange portion 27b, that is, to the flange portion 27b for example, while connection holes 63 which are arranged at corresponding plural portions in the circumferential direction and which allow the connection members 62 to be slidably inserted thereinto in the axis direction of the screw member 27 are formed on the other of the screw compensation member 61 and the flange portion 27b, that is, on the screw compensation member 61 for example. With these connection members 62, the screw member 27 and the screw compensation member 61 are connected to be rotatable bodily in the rotational direction but to be relatively slidable in the axial direction.

A compression spring 64 comprising a coil spring as urging member is interposed between the flange portion 27b of the screw member 27 and the screw compensation member 61. By the resilient force of the spring 64, the screw member 27 is urged to move away from the screw compensation member 61 toward the brake rotor 10 in the thrust direction of the screw member 27. The resilient force in the thrust direction given by the spring 64 presses the male screw portion of the screw member 27 on the female screw portion of the screw hole 26 to generate friction resistance therebetween. With this construction, when the screw member 27 is rotated, the screw compensation member 61 is also rotated together through the connection members 62, so that the screw member 27 and the screw compensation member 61 are bodily moved by the action of screw in the axial direction. Thus, even when the screw member 27 is axially moved, the deformation amount of the spring 64 provided between the screw member 27 and the screw compensation member 61 is not varied and is compensated to maintain a constant spring force at all times. Accordingly, the friction resistance acting on the screw portion of the screw member 27 is constant regardless of the axial movement of the screw member 27, so that it can be realized to apply a fixed or constant friction resistance to the screw member 27.

The aforementioned screw compensation member 61, the connection portions (connection members) 62 and the spring 64 constitute an operation resistance application mechanism 65 for applying the constant operation resistance (friction resistance) on the screw member 27 regardless of the movement of the screw member 27. In a modified form, the connection portions 62 may take the configuration that one or more engaging portions are provided between the facing surfaces of the flange portion 27b of the screw member 27 and the screw compensation member 61 for engaging the flange portion 27b and the screw compensation member 61 to be rotatable bodily in the rotational direction and to be relatively movable in the axial direction.

As described above, in the second embodiment, a predetermined operation resistance is applied by the operation resistance application mechanism 65 to the screw member 27. Thus, upon rotation of the input shaft 25, it occurs ordinarily that the rotational member 28 is rotated together with the flexible spline 35, wherein the circular spline 36 and the screw member 27 are not rotated to remain in a stop state. Then, when the rotation of the rotational member 28 causes the rolling rollers 51 to come into engagements with the respective stopper portions 45c, 46c (the rotation limiting means 55) of the first and second cam portions 45, 46, the rotation (reverse rotation) of the flexible spline 35 and the rotational member 28 is restricted, and instead, the rotation of the input shaft 25 then causes the screw member 27 to rotate together with the circular spline 36 against the operation resistance given by the operation resistance application mechanism 65.

According to the foregoing second embodiment, since the operation resistance application mechanism 65 is configured to apply the predetermined operation resistance to the screw member 27, it becomes unnecessary to rely on the friction at the screw engagement of the screw member 27 for the operation resistance. Thus, even where the screw hole 26 of the caliper 11 and the screw member 27 are configured to be somewhat rough in the accuracy of the screw engagement therebetween, it can be realized to reliably apply the operation resistance to the screw member 27.

FIG. 9 shows a modification of the foregoing second embodiment, wherein in substitution for the spring 64, an elastic rubber 66 is interposed in a compressed state between the flange portion 27b of the screw member 27 and the screw compensation member 61. The same operation and effect as that of the spring 64 can be achieved with this configuration. The elastic rubber 66 may take a single ring-shape. In place of the single ring-shape elastic rubber 66, there may be taken a construction that a plurality of stick-like elastic rubbers are circumferentially arranged at, preferably, equiangular intervals.

Third Embodiment

FIGS. 10 and 11 show a third embodiment according to the present invention. The difference from the foregoing second embodiment is that an operation resistance acting in radial directions is applied to the screw member 27.

Referring to FIGS. 10 and 11, storage pockets 71 (refer to FIG. 11) are formed in the flange portion 27b of the screw member 27 at, e.g., two places (preferably, two diametrically opposed places) in the circumferential direction. The storage pockets 71 open at the external surface of the flange portion 27b. Friction engaging pieces 72 of square shape are fitted respectively in the storage pockets 71 to be slidable in the radial directions only. Radial external surfaces of the friction engaging pieces 72 are formed as screw portions 72a which are screw-engaged with the screw hole 26 of the caliper 11. Springs 73 each comprising a coil spring as urging member are interposed between respective bottom portions of the storage pockets 71 and the friction engaging pieces 72 fitted therein. The springs 73, by the urging forces, press the friction engaging pieces 72 on the screw hole 26 of the caliper 11 from inside of the screw member 27, so that the screw portions 72a of the friction engaging pieces 72 are brought into friction engagements with the screw hole 26 of the caliper 11. The friction engaging pieces 72 and the springs 73 constitute the operation resistance application mechanism 65 for applying the fixed or constant operation resistance to the screw member 27.

According to the foregoing third embodiment, since the friction engaging pieces 72 are rotated bodily with the screw member 27, the friction engaging pieces 72 can be moved bodily with the screw member 27 in the axial direction of the screw member 27 to follow the lead of the screw. Therefore, without additionally providing the screw compensation member 61 as used in the foregoing second embodiment, it can be realized to apply a fixed or constant operation resistance stably regardless of the axial movement of the screw member 27.

Fourth Embodiment

FIG. 12 shows a part of a fourth embodiment according to the present invention, wherein one or several (preferably, two) storage holes 171 are formed in the caliper 11 each to pass through the caliper 11 approximately in a radial direction of the screw member 27, and a friction engaging piece 172 is received in each storage hole 171 to be slidable in its axial direction only. A screw portion 172a which is screw-engaged with the screw portion of the screw member 27 is formed at an inner end surface of each friction engaging piece 172. A spring seat 174 is screwed into an opening end of each storage hole 171 on the external surface of the caliper 11, and a spring 173 comprising a coil spring as urging member for pressing each friction engaging piece 172 on the screw portion of the screw member 27 is interposed between the spring seat 174 and the friction engaging piece 172. The resilient force of the spring 173 presses the friction engaging piece 172 on the screw portion of the screw member 27 in the radial direction of the screw member 27. The aforementioned friction engaging pieces 172 and the springs 173 constitute the operation resistance application mechanism 65 for applying a fixed or constant operation resistance to the screw member 27.

That is, the foregoing third embodiment is configured to press the friction engaging pieces 72 on the screw hole 26 of the caliper 11 from inside of the screw member 27 in the radial directions of the same, whereas the fourth embodiment is configured to press each friction engaging piece 172 on the screw portion of the screw member 27 from outside of the screw member 27. According to the fourth embodiment, it can be realized to apply a fixed or constant operation resistance on the screw member 27 by pressing each friction engaging piece 172 on the screw portion of the screw member 27 by the resilient force of the spring 173.

Herein, it is to be noted that as described earlier in the modification of the second embodiment, an elastic member such as elastic rubber can be used also in the third and fourth embodiments in substitution for each of the springs 73, 173.

Fifth Embodiment

FIG. 13 shows a fifth embodiment according to the present invention, wherein magnetic forces of permanent magnets 273 are utilized as the operation resistance application mechanism 65. Storage pockets like the storage pockets 11 shown in FIG. 11 are formed in the flange portion 27b of the screw member 27 at, e.g., two places in the circumferential direction to open on the external surface of the flange portion 27b, and friction engaging pieces 272 of square shape are fitted respectively in the storage pockets to be slidable in the radial directions only, as shown in FIG. 13. Screw portions 272a which are screw-engaged with the screw hole 26 of the caliper 11 are formed on the radial external surfaces of the friction engaging pieces 272. A pair of permanent magnets 273, 273 are respectively planted in bottom portions of the storage pockets, and another pair of permanent magnets 273, 273 are respectively planted in portions, facing the bottom portions, on the internal surface of the friction engaging pieces 272. The permanent magnet 273 on the bottom portion of each storage pocket and the permanent magnet 273 on the corresponding portion of the internal surface face each other with respective polarities repelling each other. By the repelling forces of the two pairs of permanent magnets 273, the friction engaging pieces 272 are pressed on the screw hole 26 of the caliper 11 from inside of the screw member 27 to bring the screw portions 272a of the friction engaging pieces 272 into friction engagements with the screw hole 26 of the caliper 11. The friction engaging pieces 272 and the permanent magnets 273 constitute the operation resistance application mechanism 65 for applying a fixed or constant operation resistance to the screw member 27.

In a modified form of this embodiment, the permanent magnets 273 may be arranged to press the friction engaging pieces 272 on the screw portion of the screw member 27 from outside of the screw member 27 in the radial directions in the same manner as the foregoing fourth embodiment. Alternatively, the permanent magnets 273 may be arranged to urge the screw member 27 in the thrust direction in a manner similar to the foregoing second embodiment.

As understood from the foregoing various embodiments, the operation resistance application mechanism 65 is not limited to the springs, the elastic rubbers or the like and may be constituted by any structure which is capable of applying or exerting an operation resistance to the thrust force support member 27 (i.e., the screw member 27) by pressing the thrust force support member 27 in the thrust direction or in the radial direction.

Even where the thrust force support member 27 is pressed in the thrust direction, the screw compensation member 61 shown in FIG. 8 is not necessarily an essential element, because the screw compensation member 61 can be omitted by selecting a spring which does not change so much in spring force when deformed with the axial movement of the thrust force support member 27.

Although the foregoing first embodiment has been described taking an example that employs a strain wave gearing as the reduction mechanism 31 having one input element and two output elements, the present invention is not limited to the employment of such a strain wave gearing. Instead, there may be used a reduction mechanism comprising a planetary gear mechanism for example. Likewise, the electric motor 22 is also not limited to the built-in motor.

Further, the foregoing first embodiment has been described taking an example wherein the rotation-linear motion converting mechanism 43 is composed of the first and second cam portions 45, 46 which are respectively provided on the facing surfaces 28a, 41a of the rotational member 28 and the axially movable member 41, and the rolling rollers 51 arranged between the first and second cam portions 45, 46. The rotation-linear motion converting mechanism 43 is not limited to the construction described in the foregoing first embodiment. For example, each curved gradient portions 45a, 46a may be modified from the shape of the curved surface to the shape of a flat surface.

Further, even where the rotation-linear motion converting mechanism 43 is constituted by using cam portions, it is not necessarily required to provide two sets of cam portions (first and second cam portions 45, 46) in face-to-face relation. Instead, the rotation-linear motion converting mechanism 43 may be implemented by the use of one set of cam portions each of which is provided at least with a gradient portion on one end side in the rotational direction and with a stepped portion of a predetermined height on other end side in the rotational direction.

Further, the foregoing first embodiment has been described taking an example wherein the wear compensating operation for the friction members 15a, 16a is carried out once a day when the engine of the vehicle is first started. However, the wear compensating operation may be executed not once a day, but each time the engine is started or each time the vehicle travels by a predetermined traveling distance or for a predetermined time period. The point is that the electric brake device should be maintained so that an appropriate gap can always be secured between the brake rotor 10 and the friction members 15*a*, 16*a* of the brake pads 15, 16 during non-braking operation.

Further, in the foregoing embodiment, the gap which should be provided between the brake rotor 10 and the brake pads 15, 16 during non-braking operation is formed by utilizing the stepped portions 45*b*, 46*b* of the rotation-linear motion converting mechanism 43. Instead, it is possible to form a slight gap between the brake rotor 10 and the brake pads 15, 16 by utilizing a backlash of the screw member 27 for example, and therefore, the stepped portions 45*b*, 46*b* are not necessarily essential components for the present invention.

Various features and many of the attendant advantages in the foregoing embodiments will be summarized as follows:

In the first embodiment typically shown in FIGS. 2-4, the electric brake device is provided with the reduction mechanism 31 operable by the electric motor 22 and having one input element and two output elements, the rotation-linear motion converting mechanism 43 operable by the reduction mechanism 31, and the thrust force support member 27. Thus, the device is not only capable of compensating the retracted positions of the braking members 15, 16 for wears of the same, but is also capable of preventing the deterioration in responsibility which would otherwise occur due to a large mass of the pressing member 42. That is, because any mechanism for compensating the retracted positions of the braking members 15, 16 for wears of the same is not provided between the rotation-linear motion converting mechanism 43 and either of the braking members 16, it can be avoided that the pressing member 42 moved linearly at the time of a braking operation would otherwise be increased in mass by the provision of any such compensating mechanism. Further, because a wear compensating mechanism constituted by, e.g., the screw member 27, the strain wave gearing (reduction mechanism) 31 and the like can be arranged at a position away from the friction members 15*a*, 16*a* of the braking members 15, 16, the electric brake device becomes unsusceptible to the influences of vibration and heat, and therefore, it can be realized to make the electric brake device hard to fail.

Also in the first embodiment typically shown in FIGS. 2 to 4, since the rotation-linear motion converting mechanism 43 is provided with the gradient portions 45*a*, 46*a* formed on one end side in the rotational direction and the stepped portions 45*b*, 46*b* of the predetermined step height formed on the other end side in the rotational direction, the rotation of one output element (i.e., the flexible spline 35) of the reduction mechanism 31 can be reliably converted by the action of the gradient portions 45*a*, 46*a* into the linear motion of the pressing member 42, and during non-braking operation, a fixed or constant gap can be secured reliably between the brake rotor 10 and the braking members 15, 16 by the use of a simplified construction.

In each of the second to fifth embodiments typically shown in FIGS. 8, 9, 10, 12 and 13, since the operation resistance application mechanism 65 is provided for exerting or applying the operation resistance to the thrust force support member 27, the thrust force support member 27 given the operation resistance can be held reliably in the stationary state during the braking operation, so that the reduction mechanism 31 having the one input element and two output elements can operate the rotation-linear motion converting mechanism 43 when operated by the electric motor 22. This advantageously obviates the need to make the thrust force support member 27 greater in operation resistance than the rotation-linear motion converting mechanism 43 and ensures that the electric brake device can operate stably in a simplified construction.

Also in each of the second to fifth embodiments typically shown in FIGS. 8, 9, 10, 12 and 13, since the operation resistance application mechanism 65 is provided with at least one urging member 64, 66, 73, 173 or 273 for applying a pressing force to the thrust force support member 27 in the thrust direction or the radial direction, it is possible to easily apply the operation resistance to the thrust force support member 27 screw-engaged with the caliper 11 by the use of the urging member 64, 66, 73, 173 or 273.

In the second embodiment and the modification thereof respectively shown in FIGS. 8 and 9, since the screw compensation member 61 screw-engaged with the caliper 11 is rotatable bodily with the thrust force support member 27, it is possible to maintain the space between the thrust force support member 27 and the screw compensation member 61 always invariable regardless of the movement in the thrust direction of the thrust force support member 27. Thus, the operation resistance which at least one urging member 64 or 66 interposed between the thrust force support member 27 and the screw compensation member 61 exerts on the thrust force support member 27 can be maintained always invariable regardless of the movement in the thrust direction of the thrust force support member 27, so that it can be realized to apply a stable operation resistance to the thrust force support member 27.

Obviously, numerous further modifications and variations of the present invention are possible in light of the above teachings. It is therefore to be understood that within the scope of the appended claims, the present invention may be practiced otherwise than as specifically described herein.

What is claimed is:

1. An electric brake device comprising:
   a braking member for being pressed against a brake rotor;
   a caliper holding the braking member;
   a pressing member connected to the braking member;
   an electric motor attached to the caliper;
   a reduction mechanism having one input element and first and second output elements for receiving an input rotation from the electric motor at the one input element and for transmitting the input rotation to the first and second output elements at reduced speeds;
   a rotation-linear motion converting mechanism connected to the first output element of the reduction mechanism for converting the rotation of the first output element into a linear motion of the pressing member when the electric motor is rotated in a positive-going direction; and
   a thrust force support member connected to the second output element of the reduction mechanism and screw-engaged with the caliper;
   wherein the rotation-linear motion converting mechanism is supported by the thrust force support member to be movable together in a thrust direction and is provided with rotation limiting means that limits the rotation of the first output element to a predetermined range to transmit the rotation of the one input element to the second output element when the electric motor is reversely rotated in a direction opposite to the positive-going direction; and
   wherein the thrust force support member is set to be greater in resistance to operation than the rotation-linear motion converting mechanism.

2. The electric brake device as set forth in claim 1, wherein the rotation-linear motion converting mechanism comprises a plurality of cam portions arranged at equiangular intervals and wherein each of the cam portions comprises a gradient portion formed on one end side in the rotational direction of the first output element and a stepped portion of a predetermined step height formed on the other end side in the rotational direction of the first output element, the predetermined step height being determined to set a clearance between the braking member and the brake rotor.

3. The electric brake device as set forth in claim 1, wherein the reduction mechanism comprises a strain wave gearing.

4. The electric brake device as set forth in claim 1, further comprising an operation resistance application mechanism for applying an operation resistance to the thrust force support member.

5. The electric brake device as set forth in claim 4, wherein the operation resistance application mechanism includes at least one urging member for applying an urging force to the thrust force support member in a thrust or radial direction of the thrust force support member.

6. The electric brake device as set forth in claim 4, wherein the operation resistance application mechanism comprises:
   a screw compensation member screw-engaged with the caliper;
   at least one urging member interposed between the screw compensation member and the thrust force support member for urging the thrust force support member to move in the thrust direction; and
   at least one connection portion for connecting the thrust force support member and the screw compensation member bodily in the rotational direction but relatively slidably in the axial direction.

7. The electric brake device as set forth in claim 4, wherein the operation resistance application mechanism includes at least one pair of permanent magnets for applying the operation resistance to the thrust force support member by the action of a repelling force generated between the at least one pair of permanent magnets.

8. An electric brake device comprising:
   a braking member for being pressed against a brake rotor;
   a caliper holding the braking member;
   a pressing member connected to the braking member;
   an electric motor attached to the caliper;
   a reduction mechanism having one input element and first and second output elements for receiving an input rotation from the electric motor at the one input element and for transmitting the input rotation to the first and second output elements at reduced speeds;
   a rotation-linear motion converting mechanism connected to the first output element of the reduction mechanism for converting the rotation of the first output element into a linear motion of the pressing member; and
   a thrust force support member connected to the second output element of the reduction mechanism and screw-engaged with the caliper;
   wherein the rotation-linear motion converting mechanism is supported by the thrust force support member to be movable together in a thrust direction and is provided with rotation limiting means for limiting the rotation in one direction of the first output element to a predetermined range;
   wherein the thrust force support member is set to be greater in resistance to operation than the rotation-linear motion converting mechanism;
   wherein the rotation-linear motion converting mechanism comprises a plurality of cam portions arranged at equiangular intervals and wherein each of the cam portions comprises a gradient portion formed on one end side in the rotational direction of the first output element and a stepped portion of a predetermined step height formed on the other end side in the rotational direction of the first output element;
   wherein the rotation-linear motion converting mechanism further comprises:
   a disc rotational member rotatable by the first output element of the reduction mechanism;
   a disc axially movable member connected to the pressing member for bodily axial movement and coaxially arranged in a face-to-face relation with the disc rotational member, wherein the plurality of cam portions are formed on at least a facing surface of the disc rotational member at equiangular intervals; and
   a plurality of rolling rolls arranged at the equiangular intervals between the facing surface of the disc rotational member and a facing surface of the disc axially movable member, for respectively rolling on the plurality of cam portions when the disc rotational member is rotated by the first output element of the reduction mechanism; and
   wherein the thrust force support member is a generally cylindrical member rotatably received in a cylindrical hole formed in the caliper and screw-engaged at a part of an external surface thereof with a screw formed at a part of the cylindrical hole of the caliper and wherein the disc rotational member and the disc axially movable member are received in a cylindrical hole formed in the thrust force support member.

9. The electric brake device as set forth in claim 8, wherein each of the cam portions formed on the at least facing surface of the disc rotational member defines a reverse end stopper at a boundary between the stepped portion and the gradient portion, the reverse end stopper serving as the rotation limiting means for limiting the rotation in one direction of the first output element to the predetermined range, and wherein the reduction mechanism is configured to rotate the thrust force support member in a positive-going direction to advance the thrust force support member toward the brake rotor along a lead of the screw formed in the caliper when the reduction mechanism receives a reverse input rotation upon a reverse rotation of the electric motor, with each of the rolling rolls being stopped by the reverse end stopper.

10. The electric brake device as set forth in claim 8, wherein each of the cam portions formed on the at least facing surface of the disc rotational member defines a top end stopper at a top end portion of each of the gradient portions, and wherein the reduction mechanism is configured to rotate the thrust force support member in a reverse direction to retract the thrust force support member away from the brake rotor along the lead of the screw formed in the caliper when the reduction mechanism receives a positive-going input rotation upon a positive-going rotation of the electric motor, with each of the rolling rolls being stopped by the top end stopper.

11. The electric brake device as set forth in claim 8, wherein the reduction mechanism comprises a strain wave gearing.

12. An electric brake device comprising:
   a braking member for being pressed against a brake rotor;
   a caliper holding the braking member;
   a pressing member connected to the braking member;
   an electric motor attached to the caliper;
   a reduction mechanism having one input element and first and second output elements for receiving an input rotation from the electric motor at the one input element and for transmitting the input rotation to the first and second output elements at reduced speeds;

a rotation-linear motion converting mechanism connected to the first output element of the reduction mechanism for converting the rotation of the first output element into a linear motion of the pressing member; and a thrust force support member connected to the second output element of the reduction mechanism and screw-engaged with the caliper, the thrust force support member being a generally cylindrical member rotably received in a cylindrical hole formed in the caliper and screw-engaged at a part of an external surface thereof with a screw formed at a part of the cylindrical hole of the caliper;

wherein the rotation-linear motion converting mechanism is received in a cylindrical hole formed in the thrust force support member to be movable together in a thrust direction and is provided with rotation limiting means that limits the rotation in one direction of the first output element to a predetermined range and that enables the rotation of the one input element transmitted to the second output element connected to the thrust force support member; and wherein the thrust force support member is set to be greater in resistance to operation than the rotation-linear motion converting mechanism.

13. The electric brake device as set forth in claim 12, wherein the rotation-linear motion converting mechanism comprises:

a disc rotational member and a disc axially movable member received in the cylindrical hole formed in the thrust force support member;

a plurality of cam portions are formed on each of the facing surfaces of the disc rotational member and the disc axially movable member at equiangular intervals and each comprising:

a gradient portion formed on one end side in the rotational direction of the first output element;

a stepped portion formed on the other end side in the rotational direction of the first output element and having a predetermined step height that is determined to set a clearance between the braking member and the brake rotor; and a stopper portion formed at a boundary portion between the gradient portion and the stepped portion and configured to operate as the rotation limiting means.

14. The electric brake device as set forth in claim 12, wherein the reduction mechanism comprises a strain wave gearing.

* * * * *